(12) United States Patent
Harada

(10) Patent No.: US 7,486,595 B2
(45) Date of Patent: Feb. 3, 2009

(54) TRACKING ERROR DETECTOR

(75) Inventor: Shingo Harada, Kanagawa (JP)

(73) Assignee: Sony Corporation (JP)

( * ) Notice: Subject to any disclaimer, the term of this patent is extended or adjusted under 35 U.S.C. 154(b) by 638 days.

(21) Appl. No.: 11/142,307

(22) Filed: Jun. 2, 2005

(65) Prior Publication Data
US 2005/0270919 A1 Dec. 8, 2005

(30) Foreign Application Priority Data
Jun. 3, 2004 (JP) ............................. 2004-165849

(51) Int. Cl.
*G11B 7/00* (2006.01)
(52) U.S. Cl. ............... 369/44.28; 369/44.27; 369/44.34
(58) Field of Classification Search .............. 369/44.28, 369/44.27, 44.34
See application file for complete search history.

(56) References Cited

U.S. PATENT DOCUMENTS

| 5,235,584 | A | * | 8/1993 | Yoshio et al. | ............ | 369/44.29 |
| 5,477,514 | A | * | 12/1995 | Watanabe et al. | ........ | 369/44.28 |
| 5,650,987 | A | * | 7/1997 | Kadowaki | ................ | 369/44.34 |
| 5,740,137 | A | * | 4/1998 | Kim | ......................... | 369/44.28 |
| 6,009,054 | A | * | 12/1999 | Kadowaki et al. | ........ | 369/44.36 |
| 7,277,367 | B2 | * | 10/2007 | Takehara | ................. | 369/44.35 |

FOREIGN PATENT DOCUMENTS

| JP | 63-152029 | 6/1988 |
| JP | 10-162381 | 6/1998 |

OTHER PUBLICATIONS

Japanese Office Action; Application No. 2004-165849; dated Jan. 25, 2007.

* cited by examiner

*Primary Examiner*—Wayne R Young
*Assistant Examiner*—Van N Chow
(74) *Attorney, Agent, or Firm*—Rader Fishman & Grauer PLLC; Ronald P. Kananen

(57) ABSTRACT

A tracking error detector receives laser light that is irradiated onto tracks on a disc surface and that is reflected from the tracks by using a light-receiving device having divided portions, binarizes signals output from the light-receiving device having divided portions in accordance with the amount of tracking error by using a signal processing circuit including a binarization circuit, and outputs a tracking error signal for tracking control on the basis of a phase difference between the binarized signals. The tracking error detector includes an inter-signal amplitude difference adjustment circuit for determining an amplitude difference between signals output from the light-receiving device, for adjusting the amplitude difference between the signals, the amplitude difference being binarized by the signal processing circuit, for equalizing the phase offset of each of the signals, and for suppressing the phase offset with respect to the tracking error signal.

3 Claims, 8 Drawing Sheets

PRIOR ART

PARASITIC CAPACITANCE

TRANSFER FUNCTION $$\frac{Vo}{Vi} = -\underbrace{\frac{GmRf-1}{GmRi+1}}_{\text{GAIN TERM}} \cdot \frac{\frac{GmRi+1}{CpiCpoRiRf}}{s^2 + \frac{(Cpi+Cpo)Ri+CpoRf}{CpiCpoRiRf}s + \frac{GmRi+1}{CpiCpoRiRf}}$$

$$\omega_n = \sqrt{\frac{GmRi+1}{CpiCpoRiRf}} \qquad Q \approx \frac{Ri\sqrt{GmRfCpiCpo}}{(Cpi+Cpo)Ri+CpoRf}$$

FIG. 10

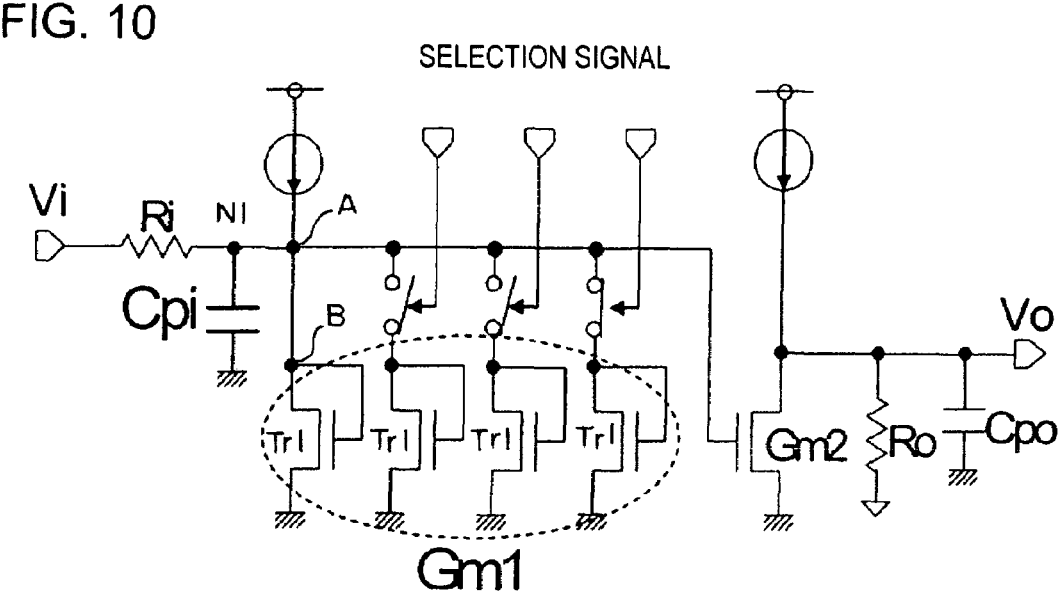

FIG. 11

$$Vi \longrightarrow \boxed{Vo/Vi} \longrightarrow Vo$$

$$\frac{Vo}{Vi} = -\frac{Gm2Ro}{Gm1Ri} \cdot \frac{1}{(C1+sCpoRo)(1+sCpi\frac{Ri}{1+Gm1Ri})}$$

$$\underbrace{\phantom{(C1+sCpoRo)}}_{\text{FIXED}} \quad \Downarrow \; Gm1 \gg \frac{1}{Ri}$$

$$(1+s\frac{Cpi}{Gm1})$$

$$\omega_{p1} = \frac{1}{CpoRo} \rightarrow \text{FIXED}$$

$$\omega_{p2} = \frac{1}{Cpi}(\frac{1}{Ri}+Gm1) \approx \frac{Gm1}{Cpi} \; (\because Gm1 \gg \frac{1}{Ri})$$

→ Cpi CHANGE CAN FOLLOW Gm1 CHANGE TO A CERTAIN DEGREE

TRACKING ERROR DETECTOR

CROSS REFERENCES TO RELATED APPLICATIONS

The present invention contains subject matter related to Japanese Patent Application JP 2004-165849 filed in the Japanese Patent Office on Jun. 3, 2004, the entire contents of which are incorporated herein by reference.

BACKGROUND OF THE INVENTION

1. Field of the Invention

The present invention relates to a tracking error detector in an optical recording and playback disc apparatus compliant with recording media including, for example, an optical disc and a magneto-optical disc.

2. Description of the Related Art

In an optical recording and playback disc apparatus of the related art, such as a DVD-ROM, as a tracking servo circuit system for irradiating laser light onto a pit sequence with high accuracy, the differential phase detector (hereinafter referred to as a "DPD") system is known. In this DPD system, when laser light reflected from a disc surface is received by a light-receiving device having divided portions, a phase difference occurs between signals output from the divided portions in accordance with the amount of tracking error, and by feeding back the phase difference information, tracking control is performed.

A tracking error detection circuit (hereinafter referred to as a "DPD circuit") block of this DPD system serves to read the phase difference information, convert it into an analog amount (for example, a voltage value), and pass it to a digital signal processor (DSP) at a subsequent stage.

The block diagram of the basic configuration of the DPD circuit block is shown in FIG. 1.

As shown in FIG. 1, at a stage prior to the DPD circuit block, there is a light-receiving device 101, such as a photodiode, having four divided portions, which receives laser light reflected from a disc surface, and each portion outputs a data waveform recorded on the disc surface.

The DPD circuit block includes: gain control amplifiers 102a, 102b, 102c, and 102d for amplifying or deamplifying a signal amplitude to an appropriate level when the signal waveforms are very small or large due to variations in the quality of photodiodes and discs; equalizer circuits 103a, 103b, 103, and 103d for accentuating high frequencies of high-frequency signal components contained in a data waveform sequence; high-pass filters 104a, 104b, 104c, and 104d for removing low-frequency components, such as DC offset, from the signal; comparators 105a, 105b, 105c, and 105d for binarizing an analog signal; phase difference detectors 106a and 106b for detecting a phase difference between binarized signals and outputting a signal corresponding to the detected phase difference; an addition circuit 107 for adding together the detection result waveforms; and a low-pass filter 108 for integrating the addition result.

In the example shown in FIG. 1, the signals output from the light-receiving device 101 having four divided portions are in phase between photodiode elements A and C and between photodiode elements B and D. Therefore, there are two systems: one in which a phase difference is detected between the photodiode elements A and B and between the photodiode elements C and D, and these are added together before the low-pass filter 108; and the other in which the signal output from each of the photodiode elements is added in advance like the photodiode device A+the photodiode device D, and the photodiode device B+the photodiode device C, and the phase difference between them is detected.

FIG. 1 shows an example of the former case. The configuration of the circuit for detecting the phase difference between the photodiode elements A and B is basically the same as the configuration of the circuit for detecting the phase difference between the photodiode elements C and D. Therefore, hereinafter, a description is given of the circuit for detecting the phase difference between the photodiode elements A and B. Of course, if the photodiode elements A and B are replaced with the photodiode elements C and D, this also can be applied as a circuit for detecting the phase difference between the photodiode elements C and D.

It is expected that, in the future, as the optical disc reading speed reaches higher multiples and optical discs of the next generation are introduced, the band of a signal that is input will increasingly shift toward a higher-frequency range. In this DPD circuit, in particular, in a DPD circuit formed by a MOS transistor whose speed is slower than a bipolar transistor and whose transconductance Gm is small, the input signal band exceeds the usage band of individual circuits. As a result, the phase characteristics of the circuit become a problem.

Here, how the phase characteristics become a problem is described in detail.

For example, in the comparators 105a and 105b of FIG. 1, that is, in high-gain comparators, it is necessary to output a waveform having a sharp through rate in order to make detection in the phase difference detector 106a at a subsequent stage easier. As stated above, since the transconductance Gm of the MOS transistor is smaller than that of the bipolar transistor, in order to obtain a high gain for realizing a sharp through rate, a configuration in which multi-stage amplifiers are cascade-connected becomes necessary.

FIG. 2 is an illustration showing the operation of a comparator having a configuration in which multi-stage amplifiers are cascade-connected.

As shown in FIG. 2, the input analog signal is gradually clipped at the level of the power-supply voltage while the analog signal passes through these multi-stage amplifiers, and it finally changes to a digital binary signal. In the signal whose amplitude is clipped, distortion occurs, and harmonic components of the original signal frequency components occur. Naturally, in each amplifier, a definite band exists, and there is a demand for an amplifier at a final stage to have a performance capable of enabling the output signal to fully swing to the power-supply voltage level. Consequently, it is necessary to use an inverter circuit for the final stage, etc. Therefore, in general, as the signal passes through the stage number of the multi-stage amplifiers, the region in which the group delay takes a fixed value becomes narrower.

FIG. 3 shows the group delay characteristic in each amplifier output of a comparator having a configuration in which the multi-stage amplifiers are cascade-connected.

If signal components equivalent to or more than those of the band at which the group delay variations start are input, an amount of delay time that differs depending on the frequency components occurs in the output signal. Then, in the amplifier output waveform in which fundamental wave components having a different amount of delay for each frequency and harmonic components that occur due to the distortion are combined, a phase shift that is difficult to predict occurs. The highest range of the input signal when, for example, a DVD is read at 8×reading speed is approximately 35 MHz; and in the 3rd output group delay characteristics of FIG. 3, the range enters a range where the variations have already occurred.

This phase shift poses a significant problem for the DPD circuit block when a large amplitude difference (4 to 5 times as large in the worst case) occurs between two signals for which a phase comparison is to be performed, such as when a variation occurs in the relative positional relationship between an objective lens and a photodiode.

FIG. 4 is an illustration showing a problem when a large amplitude difference occurs between two signals for which a phase comparison is to be performed.

That is, in the comparators 105a and 105b in which amplifiers are formed at many stages, in the example of part (b) of FIG. 4 in which, for example, an input amplitude is comparatively large, when the signal passes through the amplifier at the first stage, the waveform is already clipped at the power-supply voltage, and distortion occurs, thereby generating a phase shift. Then, as the signal passes through the amplifiers at the second stage, the third stage, etc., the phase shift is accumulated. Next, in the example of part (a) of FIG. 4 in which the input amplitude is comparatively small, the waveform is not clipped at the first stage, and neither distortion nor a phase shift occurs. Then, if the waveform is eventually clipped by the amplifier output at the second stage and a phase shift occurs, naturally, the final amount of accumulation of the phase shift becomes smaller than on the large amplitude signal input side in part (b) of FIG. 4.

As a system in which such a DPD system that receives laser light reflected from a disc surface by using a light-receiving device having divided portions and performs tracking control by using the fact that a phase difference occurs between signals output from the divided device in accordance with the amount of tracking error, there is a known system in which characteristics of low-frequency passing means for outputting a tracking error signal in response to a different control operation are switched to improve the accuracy of tracking servo control (refer to, for example, Japanese Unexamined Patent Application Publication No. 10-162381).

SUMMARY OF THE INVENTION

In such a tracking error detector of the related art, the following shortcomings exist. That is, when there is an amplitude difference between input signals to the comparators 105a and 105b, a phase shift different for each path occurs, causing an offset to occur in the output of the DPD circuit block. It is difficult for the tracking error detector to cope with such a phenomenon. Also, the amplitude difference between the input signals gradually changes during operation. Therefore, the amount of offset changes moment by moment, and the elimination thereof is not easy.

The present invention has been made in view of such a situation. Accordingly it is preferable to provide a tracking error detector capable of suppressing an offset that occurs in an error output signal due to an amplitude difference between signals for which phase comparison is to be performed and capable of realizing tracking error detection with high accuracy.

According to an embodiment of the present invention, there is provided a tracking error detector including an inter-signal amplitude difference adjustment circuit that detects an amplitude difference between signals output from a light-receiving device, adjusts using a signal processing circuit the amplitude difference between the binarized signals on the basis of the detection result, equalizes the phase offset of each of the signals, based on waveform distortion that occurs in each of the signals in the comparator, and suppresses the phase offset with respect to a tracking error signal that is output on the basis of the phase difference between the signals.

According to the embodiment of the present invention, an advantage is afforded in that it is possible to provide a tracking error detector that detects an amplitude difference between signals output from a light-receiving device, that adjusts using the signal processing circuit the amplitude difference between the binarized signals on the basis of the detection result, that is capable of equalizing the phase offset of each of the signals, based on waveform distortion that occurs in each of the signals in the comparator, that is capable of canceling out the phase offset contained in a tracking error signal because the tracking error signal is output on the basis of the phase difference between the signals, that is capable of suppressing the phase offset that occurs in the tracking error signal due to an amplitude difference between signals for which phase comparison is to be performed, and that is capable of realizing tracking error detection with high accuracy.

The object of providing a tracking error detector that is capable of suppressing the phase offset that occurs in a tracking error signal due to an amplitude difference between signals for which phase comparison is to be performed and capable of realizing tracking error detection with high accuracy is realized by providing an inter-signal amplitude difference adjustment circuit that detects an amplitude difference between signals output from a light-receiving device, that adjusts using the signal processing circuit the amplitude difference between the binarized signals on the basis of the detection result, that is capable of equalizing the phase offset of each of the signals, based on waveform distortion that occurs in each of the signals in the comparator, and that suppresses the phase offset with respect to the tracking error signal that is output on the basis of the phase difference between the signals.

BRIEF DESCRIPTION OF THE DRAWINGS

FIG. 10 is a circuit diagram showing a configuration in which a gain is changed by switching transistors arranged in parallel by using a switch whose conduction and non-conduction are controlled in accordance with a selection signal in the tracking error detector according to the first embodiment of the present invention;

FIG. 11 is an illustration showing, from a transfer function, the fact that only the overall gain can be changed without changing phase characteristics in the tracking error detector according to the first embodiment of the present invention;

DESCRIPTION OF THE PREFERRED EMBODIMENTS

First Embodiment

Figure 1:
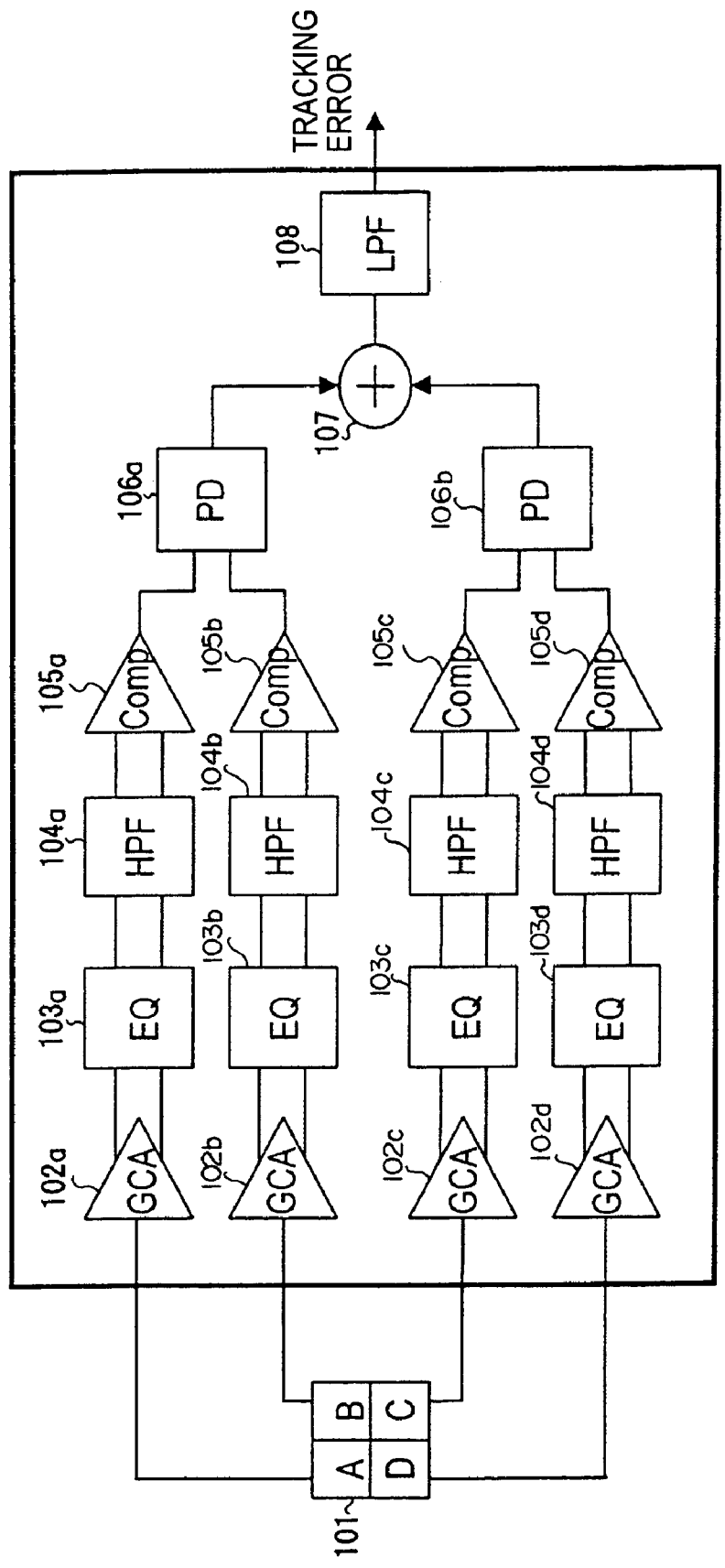
FIG. 1 is a block diagram showing the basic configuration of a DPD circuit block of the related art.
Figure 2:
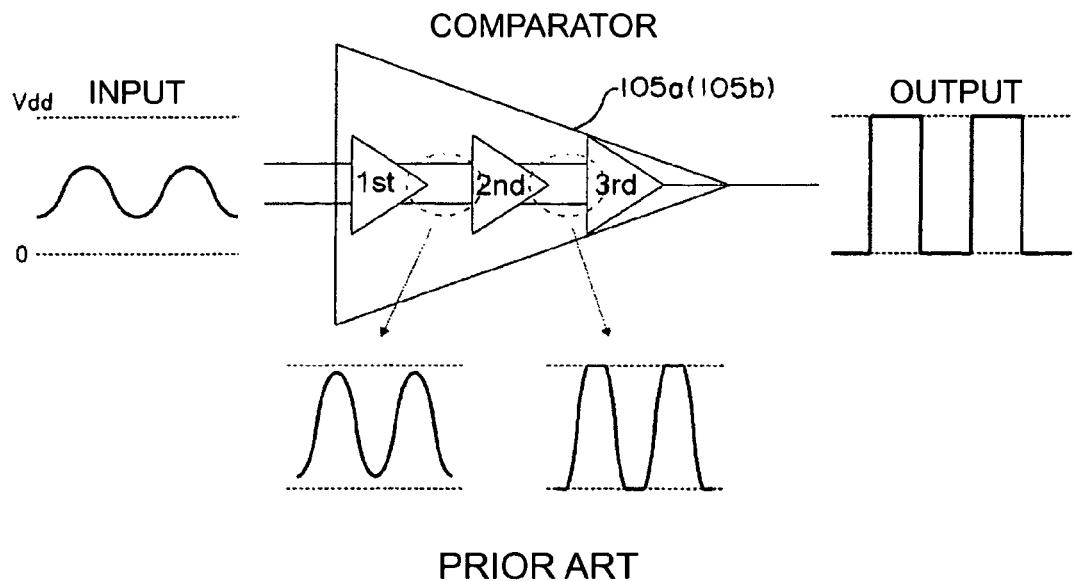
FIG. 2 is an illustration showing the operation of a comparator having a configuration in which multi-stage amplifiers in a DPD circuit block of the related art are cascade-connected.
Figure 3:
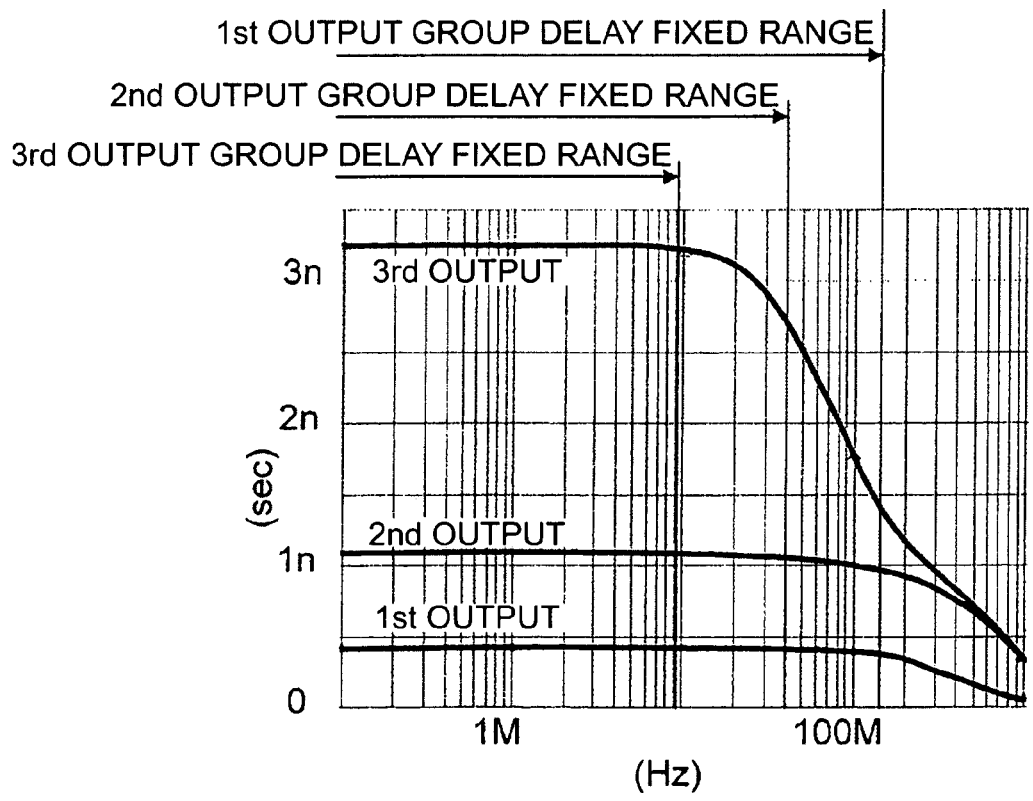
FIG. 3 shows the group delay characteristic in each amplifier output of a comparator having a configuration in which multi-stage amplifiers in a DPD circuit block of the related art are cascade-connected.
Figure 4:
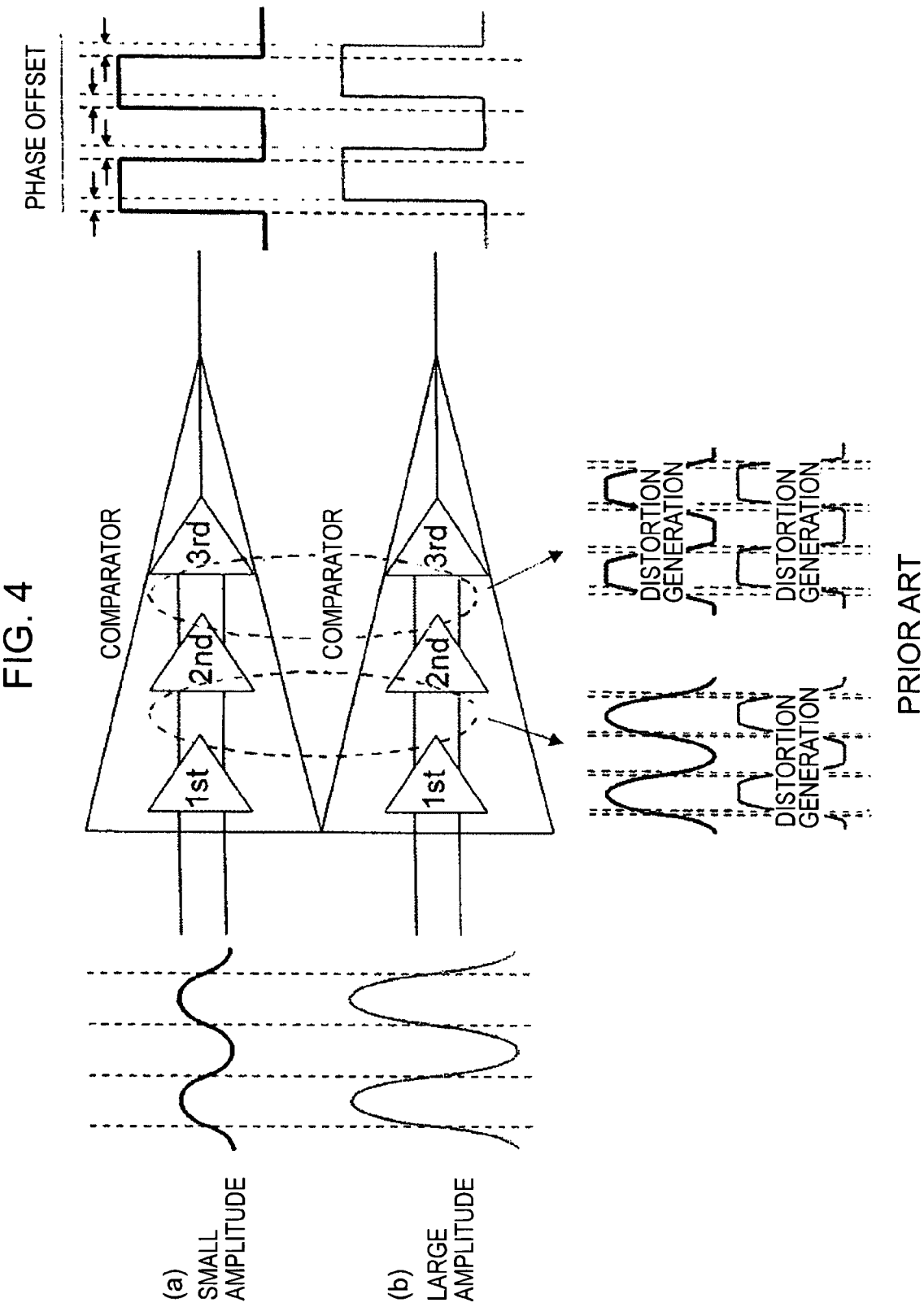
FIG. 4 is an illustration showing a problem when a large amplitude difference occurs between two signals for which a phase comparison is to be performed in the DPD circuit block of the related art.
Figure 5:
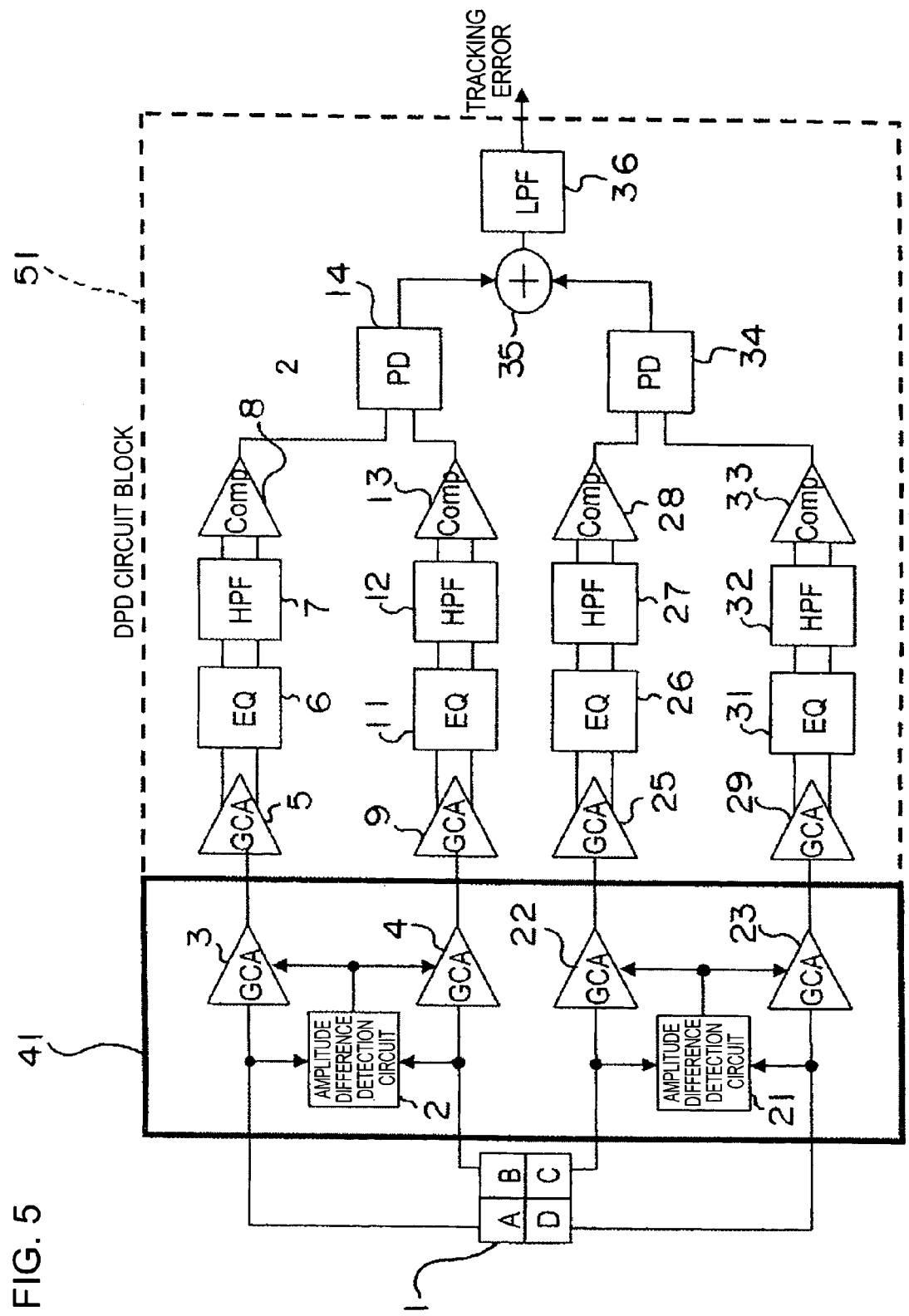
FIG. 5 is a block diagram showing the configuration of a tracking error detector according to a first embodiment of the present invention.

FIG. 5 is a block diagram showing the configuration of a tracking error detector according to a first embodiment of the present invention.

The tracking error detector has a function for equalizing the amplitude difference between signals in real time so that the amplitude between the two signals input to a comparator typically become the same.

As shown in FIG. 5, the tracking error detector includes; a light-receiving device 1; an inter-signal amplitude difference adjustment circuit 41; and a tracking error detection circuit (hereinafter referred to as a "DPD circuit") block (signal processing circuit) 51 of a differential phase detector (hereinafter referred to as a "DPD") system.

The light-receiving device 1 is formed of four-division photodiode elements A, B, C, and D for receiving laser light reflected from a disc surface, and each element outputs a data waveform recorded on the disc surface.

The inter-signal amplitude difference adjustment circuit 41 includes amplitude difference detection circuits 2 and 21 and gain control amplifiers 3, 4, 22, and 23.

The gain control amplifier 3 is an amplifier for amplifying a signal output from the photodiode element A. The gain control amplifier 4 is an amplifier for amplifying a signal output from the photodiode element B. The gain control amplifier 22 is an amplifier for amplifying a signal output from the photodiode element C. The gain control amplifier 23 is an amplifier for amplifying a signal output from the photodiode element D.

The gain control amplifiers 3 and 4 are each configured to be capable of adjusting the gain on the basis of a gain adjustment signal output from the amplitude difference detection circuit 2. The gain control amplifiers 22 and 23 are each configured to be capable of adjusting the gain on the basis of a gain adjustment signal output from the amplitude difference detection circuit 21.

The amplitude difference detection circuit 2 functions to detect an amplitude difference between signals output from the photodiode element A and the photodiode element B and to output a gain adjustment signal for the gain control amplifiers 3 and 4 on the basis of the detection result. Also, the amplitude difference detection circuit 2 functions to adjust the gain of the gain control amplifiers 3 and 4 in accordance with each gain adjustment signal so as to equalize the amplitude difference between the signals output from the gain control amplifiers 3 and 4.

The amplitude difference detection circuit 21 functions to detect an amplitude difference between signals output from the photodiode element C and the photodiode element D and to output a gain adjustment signal for the gain control amplifiers 22 and 23 on the basis of the detection result. Also, the amplitude difference detection circuit 21 functions to adjust the gain of the gain control amplifiers 22 and 23 in accordance with each gain adjustment signal so as to equalize the amplitude difference between the signals output from the gain control amplifiers 22 and 23.

A DPD circuit block 51 includes; gain control amplifiers 5, 9, 25, and 29 for amplifying or deamplifying a signal amplitude to an appropriate level when the signal waveforms output from the gain control amplifiers 3, 4, 22, and 23 are very small or large due to variations in the quality of photodiodes and discs; equalizer circuits 6, 11, 26, and 31 for accentuating high frequencies of high-frequency signal components contained in a data waveform sequence; high-pass filters 7, 12, 27, and 32 for removing low-frequency components, such as DC offset, from the signal; comparators 8, 13, 28, and 33 for binarizing an analog signal; phase difference detectors 14 and 34 for detecting a phase difference between binarized signals and outputting a signal corresponding to the detected phase difference; an addition circuit 35 for adding together the detection result waveform; and a low-pass filter 36 for integrating the addition result.

The DPD circuit block 51 is based on a system in which the signals output from the four-division light-receiving device 1 are in phase between the photodiode elements A and D and between the photodiode elements B and C, and a phase difference is detected between the photodiode elements A and B and between the photodiode elements C and D, and these are added together before the low-pass filter 36.

In the inter-signal amplitude difference adjustment circuit 41 and the DPD circuit block 51, the configuration of the-circuit for detecting a phase difference between the photodiode elements A and B is basically the same as the configuration of the circuit for detecting the phase difference between the photodiode elements C and D. Accordingly, hereinafter, a description is given of the circuit for detecting the phase difference between the photodiode elements A and B. Of course, if the photodiode elements A and B are replaced with the photodiode elements C and D, this also can be applied as a circuit for detecting the phase difference between the photodiode elements C and D.

Next, the operation of the tracking error detector is described.

In the tracking error detector according to the first embodiment, an amplitude difference between signals is adjusted to be approximately the same in real time so that the amplitude between the signals, which are input to the comparator 8 and the comparator 13, typically become the same. The reason for this is that, if an amplitude difference exists between the signals, the amount of distortion that occurs each time the signal passes through the multi-stage amplifiers inside the comparators 8 and 13, that is, the amount of harmonic wave components, differ, with the result that the amount of phase shift that occurs in the output waveform at each stage differs. Therefore, by equalizing the amplitude difference, the amount of distortion is made the same, with the result that the amount of phase shift becomes the same. Consequently, adverse influences of the difference in the amounts of phase shift, which are exerted on the output of the DPD circuit block 51, are suppressed.

As a means for equalizing the signal amplitude, as shown in FIG. 5, the inter-signal amplitude difference adjustment circuit 41 including amplitude difference detection circuits 2 and 21 and gain control amplifiers 3, 4, 22, and 23 is newly provided. Thus, the gain control amplifiers 3 and 4 are individually controlled in accordance with the amplitude difference detection result by the amplitude difference detection circuit 2, and the gain control amplifiers 22 and 23 are individually controlled in accordance with the amplitude difference detection result by the amplitude difference detection circuit 21.

For example, if the amplitude of the signal from the photodiode element A is twice the amplitude of the signal from the photodiode element B, while the gain of the gain control amplifier 3 is kept at one time as large, the gain of the gain control amplifier 4 is made twice, so that the input signal from the photodiode element A and the input signal from the photodiode element B, which are input to the gain control amplifier 5 and the gain control amplifier 9, have the same amplitude.

Alternatively, for the gain control amplifier 5 and the gain control amplifier 9, amplifiers whose gain can be adjusted individually are used, and a gain adjustment signal output by the amplitude difference detection circuit 2 is output to the gain control amplifiers 5 and 9. It is assumed that the gains of the gain control amplifiers 5 and 9 are set the same to correct the variation in the overall gain of the output signal due to variations in manufacture and design of the light-receiving device 1. In addition, the gain control amplifier 5 and the gain control amplifier 9 have the function of correcting the amplitude between signals output from the photodiode element A and the photodiode element B. Based on the detection result of the amplitude difference detection circuit 2, the gain control amplifiers 5 and 9 are gain controlled for each path. In this case, the gain control amplifier 3 and the gain control amplifier 4 become unnecessary.

The same applies to the gain control amplifier 25 and the gain control amplifier 29. For the gain control amplifier 25 and the gain control amplifier 29, gain-adjustable amplifiers are used, and a gain adjustment signal output by the amplitude difference detection circuit 21 is output to the gain control amplifiers 25 and 29. It is assumed that the gains of the gain control amplifiers 25 and 29 are set the same in order to correct variations in the overall gain of the output signal due to variations in manufacture and design of the light-receiving device 1. In addition, the gain control amplifier 25 and the gain control amplifier 29 have the function of correcting the amplitude between signals output from the photodiode element C and the photodiode element D. Based on the detection result of the amplitude difference detection circuit 21, the gain control amplifiers 25 and 29 are gain controlled for each path. In this case, the gain control amplifier 22 and the gain control amplifier 23 become unnecessary.

In this case, when general resistance-feedback amplifiers are used for the gain control amplifiers 3 and 4 and the gain control amplifiers 5 and 9, in different gain settings, the phase characteristics of the complete amplifiers are affected. As a result, a different phase offset occurs in each gain control amplifier.

Figure 6:
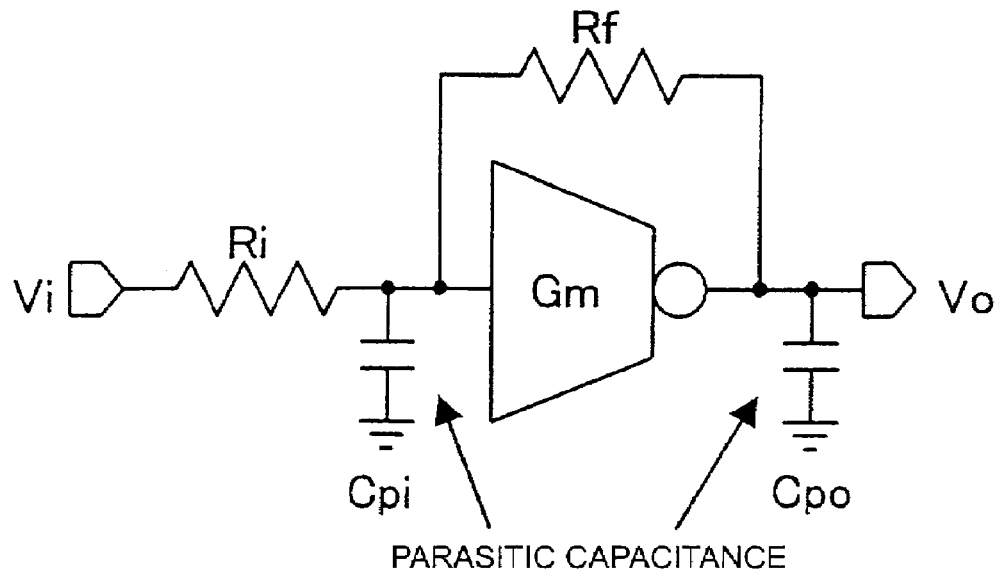
FIG. 6 is a circuit diagram showing a general resistance-feedback amplifier for the purpose of illustrating the tracking error detector according to the first embodiment of the present invention.

FIG. 6 is a circuit diagram showing a resistance-feedback amplifier using such a well known operational amplifier.

In the first embodiment, the amount of phase offset and variations of phase characteristics due to gain setting for each gain control amplifier are suppressed.

A description is given below of the suppression of the amount of phase offset and variations of phase characteristics due to gain setting variations in each gain control amplifier.

The phenomenon in which the amount of phase offset and phase characteristics vary due to the gain setting in this gain control amplifier can be explained from a transfer function determined from a model of the general resistance-feedback amplifier. Here, Gm indicates the gain of the operational transconductance amplifier shown in FIG. 7, Ri indicates input resistance, Rf indicates feedback resistance, and Cpi and Cpo indicate parasitic capacitances in input and output nodes, respectively.

This transfer function is basically a second order system although, of course, depending on the absolute values of the parameters Ri, Rf, Cpi, and Cpo, and the phase characteristics are determined by the parameters $\omega n$ and Q. In this amplifier, the gain=(GmRf−1)/(GmRi+1) is determined by the ratio (Rf/Ri) of the resistances.

Figure 7:
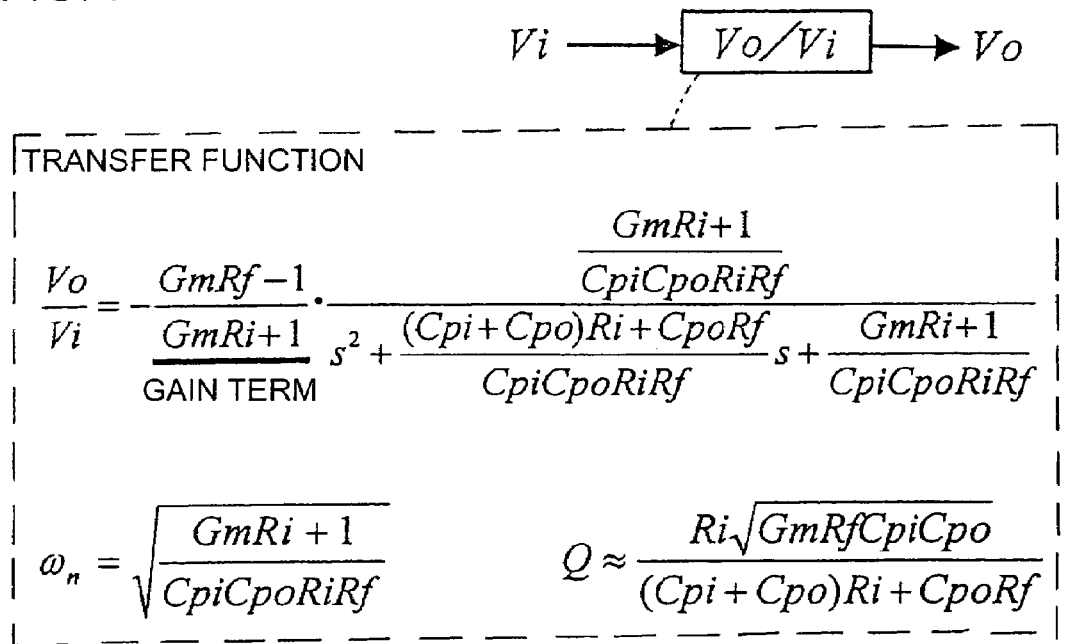
FIG. 7 is an illustration showing a transfer function determined from a model of a general resistance-feedback amplifier.

Therefore, in order to change this ratio, the resistance Ri or the resistance Rf needs to be changed. However, if these are changed, as shown in FIG. 7, the values of $\omega n$ and Q are directly varied, and the phase characteristics are changed. That is, it is difficult to change the gain without changing $\omega n$ and Q.

Figure 8:
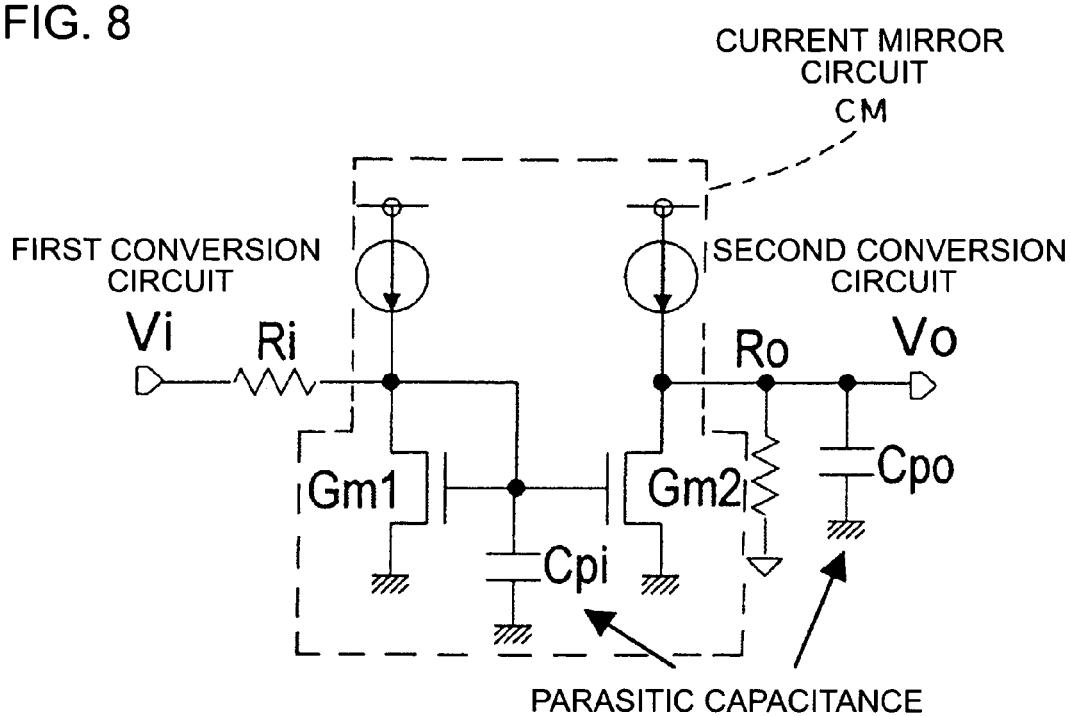
FIG. 8 is a basic circuit diagram of a circuit in which variations of phase characteristics with respect to the change of a gain used in the tracking error detector according to the first embodiment of the present invention can be suppressed.

Accordingly, a circuit capable of suppressing variations of phase characteristics even though the gain is changed is shown in FIG. 8.

FIG. 8 is a basic circuit diagram of a circuit in which variations of phase characteristics with respect to the change of a gain can be suppressed.

Figure 9:
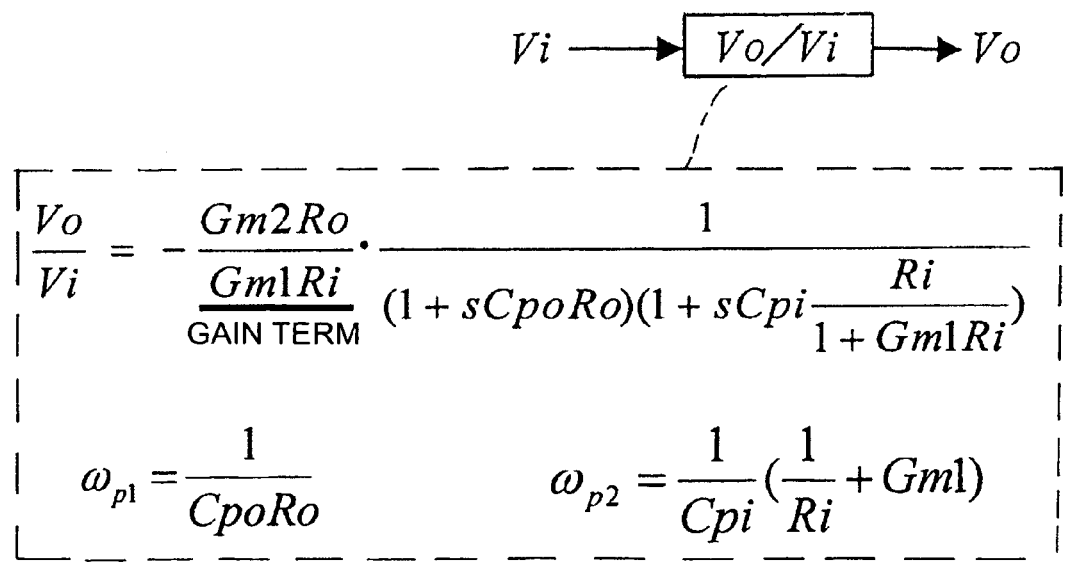
FIG. 9 is an illustration showing a transfer function and two poles of a circuit in which variations of phase characteristics with respect to the change of a gain used in the tracking error detector according to the first embodiment of the present invention can be suppressed.

FIG. 9 is an illustration showing a transfer function Vo/Vi of the circuit shown in FIG. 8 and $\omega p1$ and $\omega p2$ at two poles of the transfer function Vo/Vi.

The circuit shown in FIG. 8 converts a voltage signal input into a current signal by using a resistance (first conversion circuit) Ri, amplifies it at the mirror ratio Gm2/Gm1 of a current mirror circuit CM, and converts the current signal output again into a voltage signal output by using a resistance (second conversion circuit) Ro.

FIG. 9 shows a transfer function Vo/Vi in which the parasitic capacitance values Cpi and Cpo are considered, and two poles $\omega p1$ and $\omega p2$ in the transfer function Vo/Vi, in the circuit shown in FIG. 8.

When the Dc gain term is viewed in this transfer function, the overall gain can be changed even if any one of the four parameters Gm1, Gm2, Ri, and Ro is changed. Since there is no loop in this circuit, this is a cascade connection function of a simple first delay system, and the phase characteristics are determined by the two poles $\omega p1$ and $\omega p2$ shown in FIG. 9.

In order to maintain the phase characteristics constant, these poles need to be kept at a fixed value. A note is taken of a parameter that allows only the gain to change without influencing $\omega p$ and $\omega p2$.

First, Ro and Cpo forming $\omega p1$ are set to fixed values. Next, the resistance Ri among Gm1, Ri, and Cpi forming $\omega p2$ is set to a value that satisfies Gm1>>1/Ri, and $\omega p2$ is set to Gm1/Cpi in an approximate manner.

Then, if the change of the parasitic capacitance value Cpi follows the change of Gm1, only the overall gain can be changed without changing $\omega p2$.

FIG. 11 is an illustration showing, from a transfer function, the fact that only the overall gain can be changed without changing phase characteristics.

Accordingly, a configuration is formed in which Gm1 is changed by switching transistors arranged in parallel by using a switch whose conduction and non-conduction are controlled in accordance with a selection signal.

In this case, the selection signal is generated on the basis of a gain adjustment signal output to the gain control amplifiers 3 and 4 from the amplitude difference detection circuit 2 on the basis of the detection result of the amplitude difference between the signals output from the photodiode element A and the photodiode element B.

FIG. 10 is a circuit diagram showing a configuration in which Gm1 is changed by switching transistors Tr1 arranged in parallel by using those switches whose conduction and non-conduction are controlled in accordance with a selection signal.

With such a configuration, since the parasitic capacitance value Cpi is composed of mainly the gate capacitance of the transistor forming Gm1, the parasitic capacitance value Cpi also increases or decreases similarly as Gm1 increases or decreases. As a result of adopting such a configuration, it is possible to realize a circuit capable of suppressing influences exerted on ωp1 and ωp2 as the gain varies.

In the example shown in FIG. 10, an example of a circuit in which the number of switches is four, that is, the variable range of Gm1 is one time to four times as great, is shown. Of course, by changing the number of transistors arranged in parallel, the variable range of Gm1 can be set as desired.

In this circuit, since the gain setting can be switched only in a digital manner, a certain degree of amplitude difference remains due to a quantization error. However, even if the amplitude is not always made uniform accurately, the offset that occurs in the final output of the DPD circuit block 51 can be made sufficiently small if the amplitude matches only within a certain range.

As described above, according to the first embodiment, the amplitude difference between signals output from the photodiode element A and the photodiode element B of the light-receiving device 1 is detected, the amplitude difference between the signals is adjusted on the basis of the detection result, and the amplitude difference between the signals is equalized. Consequently, the amount of phase offset of each of the signals based on the waveform distortion that occurs in each of the signals in the comparators 8 and 13 can be equalized. As a result, the phase offset contained in the tracking error signal that is output on the basis of the phase difference between the signals can be cancelled out. The phase offset that occurs in the tracking error signal due to the amplitude difference between the signals for which phase comparison is to be performed can be suppressed. Thus, a tracking error detector capable of realizing tracking error detection with high accuracy can be provided.

In the DPD-system tracking servo for an optical disc, such as a DVD, there is the advantage of capably providing a tracking error detector that removes an offset of an output, which is caused by an amplitude difference between signals, due to the change in the relative position between the lens and the light-receiving section, which becomes obvious as the reading speed reaches higher multiples in an optical disc of the next generation.

Furthermore, since superior advantages can be expected in a circuit formed by a CMOS without being restricted to a bipolar transistor, there is the advantage that the DPD circuit separated as a front end chip because it is implemented by a bipolar transistor at present can be integrated with a signal processing chip realized by a CMOS at a subsequent stage.

Second Embodiment

In a second embodiment, a description is given of an example of a circuit in which the circuit configuration shown in FIG. 10 is improved to lower the input impedance of the node N1.

In the circuit configuration shown in FIG. 10, when the input impedance of the node N1 is high and the input current signal after being converted by the resistor R1 is large, the voltage variation of the node N1 is large, causing distortion. In order to reduce this distortion, a common gate stage transistor (input impedance reduction circuit) Tr2 is provided between the nodes A and B in order to lower the input impedance of the node N1.

Figure 12:
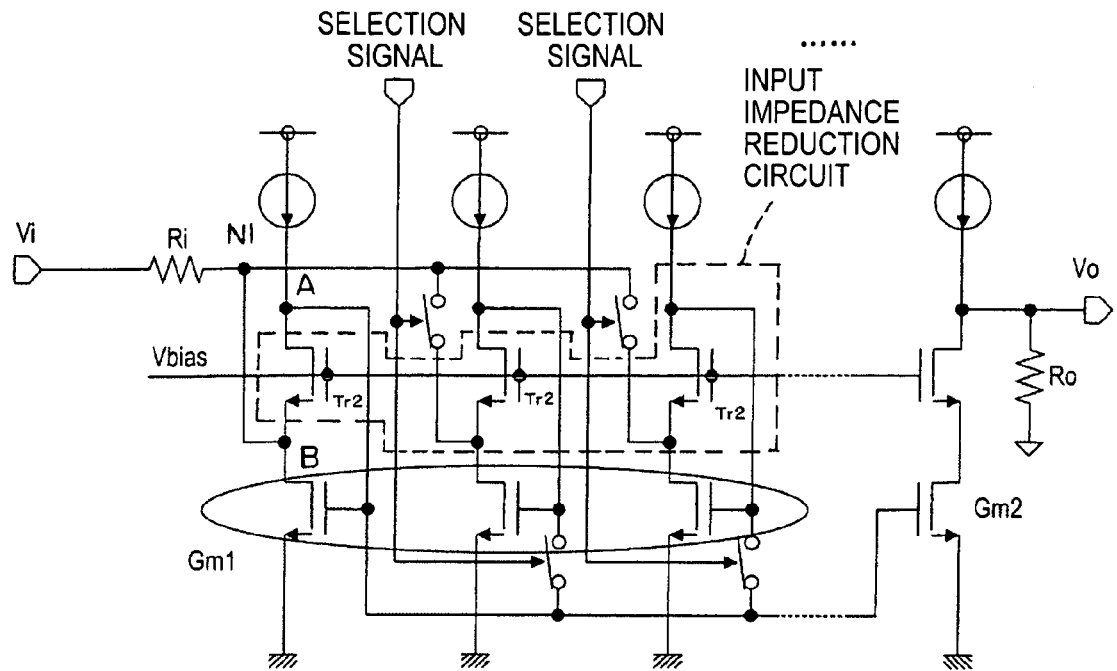
FIG. 12 is a circuit diagram showing an example of a circuit configuration for decreasing the input impedance of a node N1 in a tracking error detector according to a second embodiment of the present invention.

FIG. 12 is a circuit diagram showing an example of a configuration in which a common gate stage transistor is provided between the nodes A and B in order to lower the input impedance of the node N1.

According to the second embodiment, as a result of a decrease of the input impedance of the node N1, even if the input current signal after being converted by the resistor R1 is large, the voltage variation of the node N1 can be suppressed, and a phenomenon, such as the change of the amount of distortion and the change of the amount of phase offset in accordance with the magnitude of the input current signal after being converted by the resistor R1, can be suppressed. Thus, a high-accuracy tracking error detector can be provided.

Third Embodiment

In a third embodiment, by controlling the gate voltage of the common gate stage transistor Tr2 used in the second embodiment by using an operational amplifier (input impedance reduction circuit) OP, the input impedance of the node N1 can be further decreased.

Figure 13:
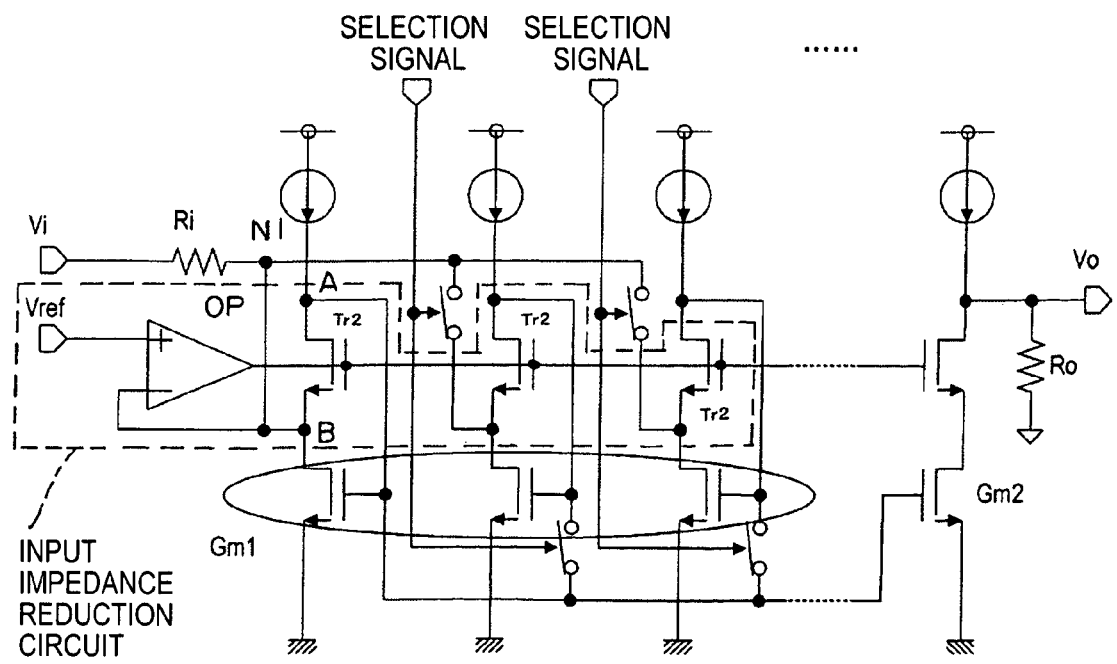
FIG. 13 is a circuit diagram showing an example of a circuit configuration for further decreasing the input impedance of the node N1 in a tracking error detector according to a third embodiment of the present invention.

FIG. 13 is a circuit diagram showing an example of such a circuit configuration capable of further decreasing the input impedance of the node Ni.

According to the third embodiment, since the node N1 is virtually short-circuited with a terminal Vref by an OP, the input impedance of the node N1 can be further decreased, and a phenomenon, such as the change of the amount of distortion and the change of the amount of phase offset in accordance with the magnitude of the input current signal after being converted by the resistor R1, can be suppressed. Thus, a tracking error detector having a high accuracy can be provided.

It should be understood by those skilled in the art that various modifications, combinations, subcombinations and alterations may occur depending on design requirements and other factors insofar as they are within the scope of the appended claims or the equivalents thereof.

What is claimed is:

1. A tracking error detector for receiving laser light that is irradiated onto tracks on a disc surface and that is reflected from the tracks by using a light-receiving device having divided portions, for binarizing signals output from the light-receiving device having divided portions in accordance with the amount of tracking error by using a signal processing circuit including a binarization circuit, and for outputting a tracking error signal for tracking control on the basis of a phase difference between the binarized signals, the tracking error detector comprising:

an inter-signal amplitude difference adjustment circuit for determining an amplitude difference between signals output from the light-receiving device, for adjusting the amplitude difference between the signals, the amplitude difference being binarized by the signal processing circuit, on the basis of the detection result, for equalizing the phase offset of each of the signals, based on the waveform distortion that occurs in each of the signals in the binarization circuit, and for suppressing the phase offset with respect to the tracking error signal that is output on the basis of the phase difference between the signals;

wherein the inter-signal amplitude difference adjustment circuit includes an amplitude difference detection circuit for detecting an amplitude difference between signals output from the light-receiving device, and based on the amplitude detection result between the signals, the amplitude detection result being detected by the amplitude difference detection circuit, the inter-signal amplitude difference adjustment circuit changes a parameter for allowing only the gain to change without influencing the phase characteristics of a gain control amplifier provided for each of the signals, sets the gain of the gain control amplifier, and eliminate the amplitude difference between the signals, binarized by the signal processing circuit.

2. The tracking error detector according to claim 1, wherein the gain control amplifier includes:

a first conversion circuit for converting the signal, which is a voltage signal input, into a current signal;

a current mirror circuit for amplifying the current signal converted by the first conversion circuit on the basis of a predetermined mirror ratio; and a second conversion circuit for converting the current signal output of the current mirror circuit into a current signal output, and the inter-signal amplitude difference adjustment circuit changes the parameter that allows the gain to change by switching the transistors that are connected in parallel in the current mirror circuit without influencing the phase characteristics of the gain control amplifier.

3. The tracking error detector according to claim 2, further comprising an input impedance reduction circuit for reducing the input impedance of a node at which the current signal is output from the first conversion circuit.

* * * * *